United States Patent [19]

Shapcott

[11] Patent Number: 5,464,089
[45] Date of Patent: Nov. 7, 1995

[54] ELECTROMAGNET CROWN SORTING AND UN-JAMMING DEVICE

[75] Inventor: Michael Shapcott, Hometown, Pa.

[73] Assignee: Zapata Technologies, Inc., Hazleton, Pa.

[21] Appl. No.: 267,078

[22] Filed: Jun. 28, 1994

[51] Int. Cl.[6] ............................................. B65G 47/24
[52] U.S. Cl. ........................... 198/392; 198/444; 198/577
[58] Field of Search ........................... 198/392, 399, 198/400, 444, 573, 577, 493

[56] References Cited

U.S. PATENT DOCUMENTS

| 3,295,661 | 1/1967 | Mitchell et al. | 198/493 |
|---|---|---|---|
| 3,910,407 | 10/1975 | Sterling | 198/392 X |
| 4,006,812 | 2/1977 | Everett et al. | 198/347.1 |
| 4,413,722 | 11/1983 | Frisbie et al. | 198/399 X |
| 4,653,627 | 3/1987 | Hampson et al. | 198/444 X |
| 4,678,073 | 7/1987 | Anderson et al. | 198/444 X |
| 4,879,025 | 11/1989 | Shapcott | 209/606 X |
| 5,090,031 | 2/1992 | Pyne et al. | 198/392 X |
| 5,186,305 | 2/1993 | Everett | 198/392 |

*Primary Examiner*—Joseph E. Valenza
*Attorney, Agent, or Firm*—Pennie & Edmonds

[57] ABSTRACT

An apparatus for sorting parts at high speed without undue wear on mechanical parts is disclosed. A mechanism for automatic removal of a defective part that is blocking the flow of parts is also provided. When a sensor downstream from the likely blockage point detects that there is no flow of parts, controlling means activate a number of steps in succession to remove the blocking part. Also disclosed are methods for achieving the desired performance of the apparatus.

18 Claims, 4 Drawing Sheets

ELECTROMAGNET CROWN SORTING AND UN-JAMMING DEVICE

TECHNICAL FIELD

This invention relates to an apparatus for sorting parts. More specifically, this invention relates to an apparatus for sorting individual parts, such as bottle crowns or caps, at high speed.

BACKGROUND OF THE INVENTION

The assignee of the present invention is a manufacturer of apparatus for sorting parts and particularly for sorting bottle caps, known as "crowns". Devices to sort parts are generally known in the prior art. Typically, as the crowns enter a sorter, they move from a large chute to a rotating hopper bowl. From the hopper bowl, the crowns move into a twist chute which separates the crowns into face up and face down, and then twists one group, so that all the crowns are facing the same way when they exit the chute into a reservoir. The crowns then enter and move along a track, where defective crowns are located and discarded. The crowns remaining in the stream are accelerated to the speed required for the feed of the production line, using mechanical drive means and air. As the crowns exit the accelerator, they are received by a rotating wheel which includes recesses to receive the crowns. The rotating wheel feeds the crowns to the production line, which typically includes application of plastic liner material into the crowns.

The mechanical parts that move the crowns along the track for sorting defective crowns, and that accelerate the crowns, undergo great wear due to the high speed of the sorter device, particularly when metal crowns are sorted. A typical prior art device utilizes magnetic wheels with recesses for the crowns that resemble gears. The metal crowns are attracted to the wheel and slip into the recesses easily. Large numbers of metal crowns, with relatively sharp edges, are constantly ground against the gears, causing the pieces to wear quickly and need replacement. In addition, all of the drive components are subject to wear from the constant use at high speed.

It is desirable to sort the crowns at a constant high rate to insure accurate crown placement for the production line, but this has been difficult to achieve in prior art mechanisms. Using mechanical components and forced air to achieve the precise speed is also difficult because the crown feed speed cannot easily be changed to accommodate increases or decreases of the production line. U.S. Pat. No. 4,006,812 to Everett et al. discloses one type of automatic feeding hopper which uses mechanical means.

Another problem with crown sorting machines is blockages or jams caused by bent crowns becoming lodged in the machine. When a blockage occurs, crown flow is stopped until the bent crown is removed. This requires an operator to notice that the crown flow has stopped, and to turn off the machine so that the blockage can be located and manually removed. Most often these blockages occur at the inlet of the twist chute, where the crowns are feeding at a high rate, normally between 2000 and 3000 per minute.

An apparatus and method for detecting defective parts is disclosed in U.S. Pat. No. 4,879,025 to Shapcott. The disclosed apparatus sorts defective parts from a stream of parts through an inspection device that activates a reject disk when a defective part is detected. The reject disk then will rotate to remove the defective part. This apparatus is effective at detecting defective crowns and removing them, but it could not be used to prevent blockages that occur as the crowns exit the hopper bowl, because it requires the crowns to already be moving along a track. Thus, a need exists for an apparatus that can detect and remove defective crowns before they move along the track.

SUMMARY OF THE INVENTION

The object of this invention is to meet the above-identified needs with an improved apparatus for detecting and removing defective or bent crowns to prevent blockages in a crown accelerator and sorting device.

In the sorting mechanism of the present invention, the crowns or parts are first located in a rotating hopper bowl. After exiting the hopper bowl, parts will pass through finger-like elements that detect the orientation of the parts. The parts will then enter a twist chute, which has two tracks. Parts on the first track are oriented differently than parts on the second track, and the sorting mechanism includes means to change the orientation of the parts on the second track so that all parts exiting the sorting mechanism have the same orientation. The oriented parts exit the twist chute into a reservoir for oriented parts.

The sorting device also includes a mechanism for defective part detection. Electromagnets are provided that are energized in a sequential consecutive manner to direct defective parts away from the path to remove said parts from the stream of parts.

An object of the invention provides for detection and removal of parts which cause the stream of parts to stop. Sensing means are provided to detect that the stream of parts has stopped moving through the sorting mechanism. Controlling means receives input information from the sensing means and provides information for the rotating hopper bowl or parts reservoir. The controlling means stops and then reverses the rotation of the hopper bowl when the sensing means detects that the stream of parts has stopped.

The detection and removal apparatus also includes a first air cylinder operatively associated with the controlling means to produce a clamping pressure on the exit chute of the hopper bowl to prevent additional parts from entering the sorting mechanism. The controlling means activates this first air cylinder after reversing the rotation of the hopper bowl. A second air cylinder is also provided that is operatively associated with the controlling means for moving a portion of the sorting means to allow jammed parts to exit. The controlling means activates the second air cylinder after the first air cylinder applies clamping pressure to the exit chute.

BRIEF DESCRIPTION OF THE DRAWINGS

The invention will be better understood if reference is made to the accompanying drawings, in which.

DESCRIPTION OF THE PREFERRED EMBODIMENTS

Figure 1:
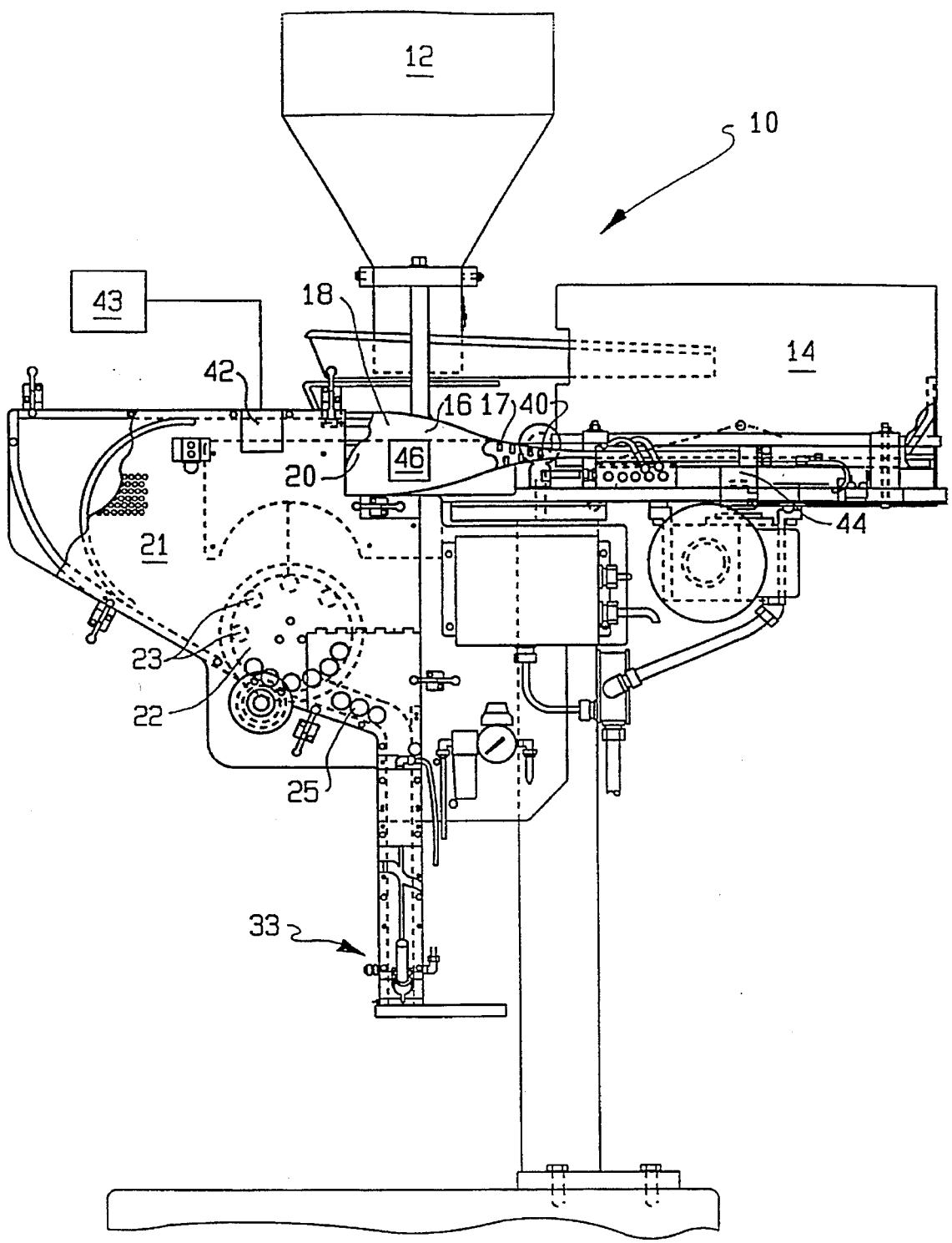
FIG. 1 represents the crown sorter and accelerator of the present invention.
Figure 2:
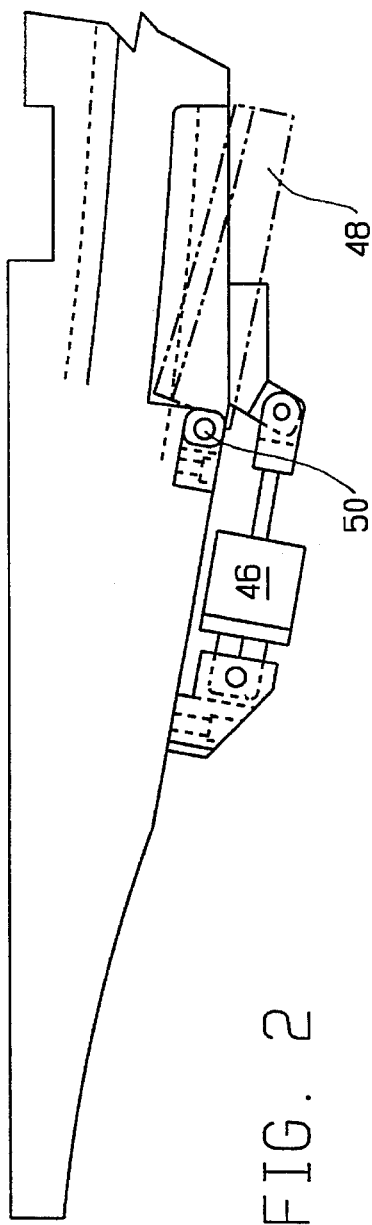
FIG. 2 is a side view of the second air cylinder of the anti-jamming mechanism.
Figure 3:
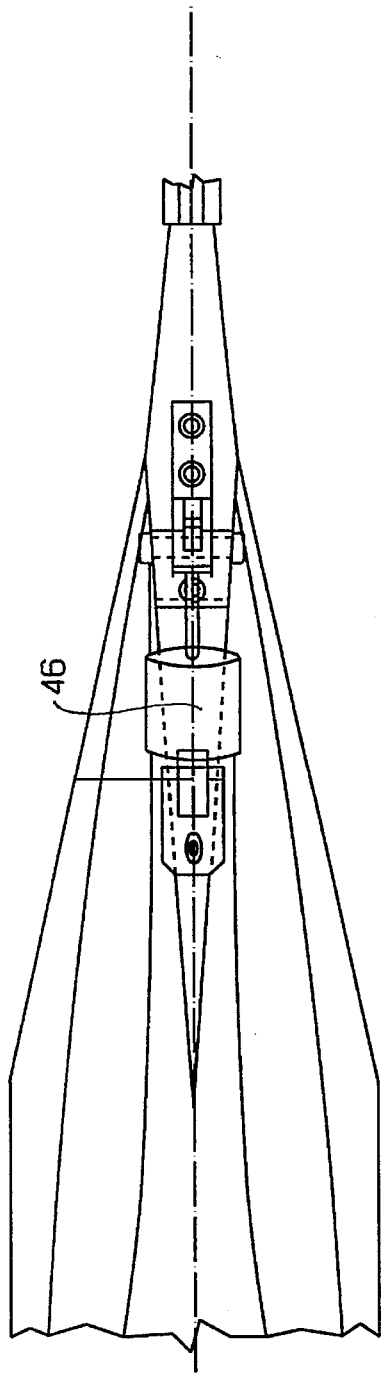
FIG. 3 is a top view of the second air cylinder of the anti-jamming mechanism.
Figure 4:
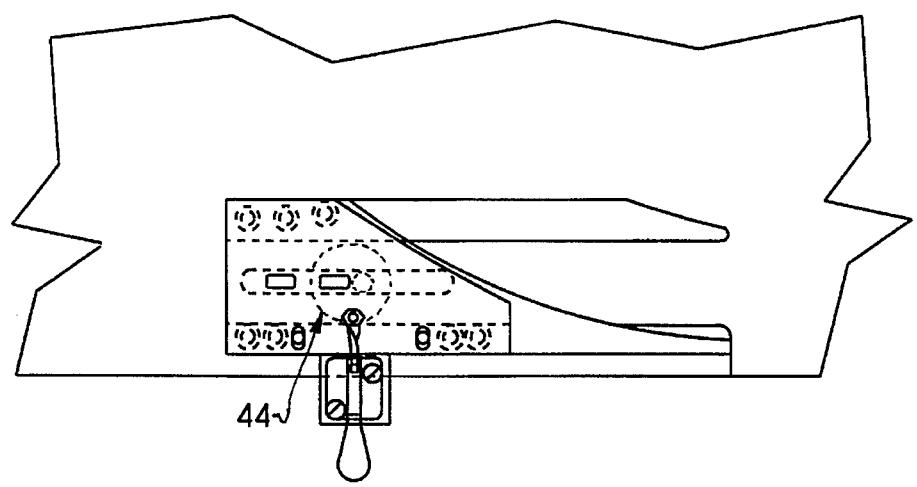
FIG. 4 is a perspective view of the first air cylinder of the anti-jamming mechanism.
Figure 5:
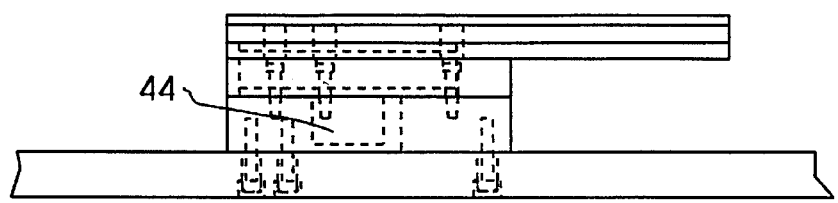
FIG. 5 is a left side view of the first air cylinder of the anti-jamming mechanism.
Figure 6:
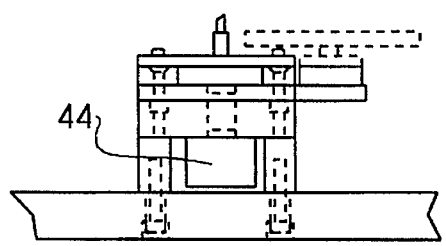
FIG. 6 is a bottom side view of the first air cylinder of the anti-jamming mechanism.

In the operation of the crown sorter and accelerator 10 of the present invention, the crowns are first introduced into a feed chute 12. The crowns then feed into a hopper bowl 14, which is constantly rotating. One type of automatic feeding hopper which describes the above structures in detail is disclosed in U.S. Pat. No. 4,006,812 to Everett et al., and is expressly incorporated herein by reference thereto.

The rotation of hopper bowl 14 acts to force the crowns into a single stream which then exits the hopper bowl 14 and enters a twist chute 16. The twist chute 16 has finger sensors 17 which detect the orientation of the crowns. These sensors 17 force crowns facing up to enter an upper track 18, and crowns facing down to enter a lower track 20. One track is designed to reverse the orientation of the crowns, so that upon exiting the twist chute 16 and entering reservoir 21, all crowns are facing the same direction. From the reservoir 21, the crowns move along a track in single file, said track preferably including a crown accelerator mechanism 22.

The problem of bent or jammed crowns exiting the hopper and causing blockages of the stream of parts to the reservoir 21 during the sorting operation is solved by a unique automatic unjamming mechanism illustrated in FIGS. 2–6. Bent crowns often become stuck in the narrow area 40 where crowns enter the twist chute 16. The entrance to the twist chute 16 is constructed to very tight tolerances so that the finger sensors 17 can detect the orientation of the crowns. When a blockage occurs, the flow of crowns is stopped until the blockage can be removed, and crowns attempt to continue to enter the chute from the hopper bowl 14 and make the blockage larger.

The present invention first automatically detects when the flow of crowns has stopped, utilizing a sensor 42 located downstream from the likely blockage point. The sensor 42 is preferably located at or near the exit of the twist chute 16. A controlling means 43, preferably in the form of a computer, is provided to receive the data from the sensor, and to activate the unjamming mechanism. Once the sensor 42 detects that the flow has stopped, a signal is sent by the computer to the hopper bowl 14. The hopper bowl 14 stops rotating, and then rotates in the opposite direction in an attempt to dislodge any crowns that are jammed at the hopper bowl exit. If the sensor 42 detects that the flow of crowns is still stopped after this first phase, the computer activates the second phase, which removes blockages near the twist chute 16.

In the second phase, a first air cylinder 44 is activated, which places a clamping pressure near the exit of the hopper bowl, to prevent crowns from exiting the hopper bowl 14. Next, a second air cylinder 46 is activated, which opens the lower portion of the chute 48. The lower portion 48 rotates on a hinge pin 50, into an open position, which allows the blockage to fall out of the chute 48, and into a waste receptacle. Then, the second air cylinder 46 closes, returning the lower portion 48 to the closed position. The first air cylinder 44 opens to release the pressure on the exit chute of the hopper bowl and allow crowns to exit the hopper bowl and enter the twist chute 16. The hopper bowl 14 starts rotating again, and the flow of crowns in normal operation is resumed.

A first crown accelerator 22 is placed adjacent the reservoir 21 and is provided with a plurality of stationary electromagnets 23. These electromagnets 23 are energized in a pulsating, sequential manner to attract and accelerate the crowns down and towards a single file track 25 as shown in FIG. 1. This arrangement helps avoid jamming and/or bridging of crowns in the reservoir 21. The present accelerator 22 replaces a rotating disc which was driven by a mechanical gear as in previous systems. The electromagnet accelerator 22 eliminates the need for a mechanical gear, and is also more effective at preventing the crowns from bridging in the reservoir 21 and becoming jammed. In addition, the stationary accelerator experiences much less wear than the rotating disc of the prior art.

Figure 7:
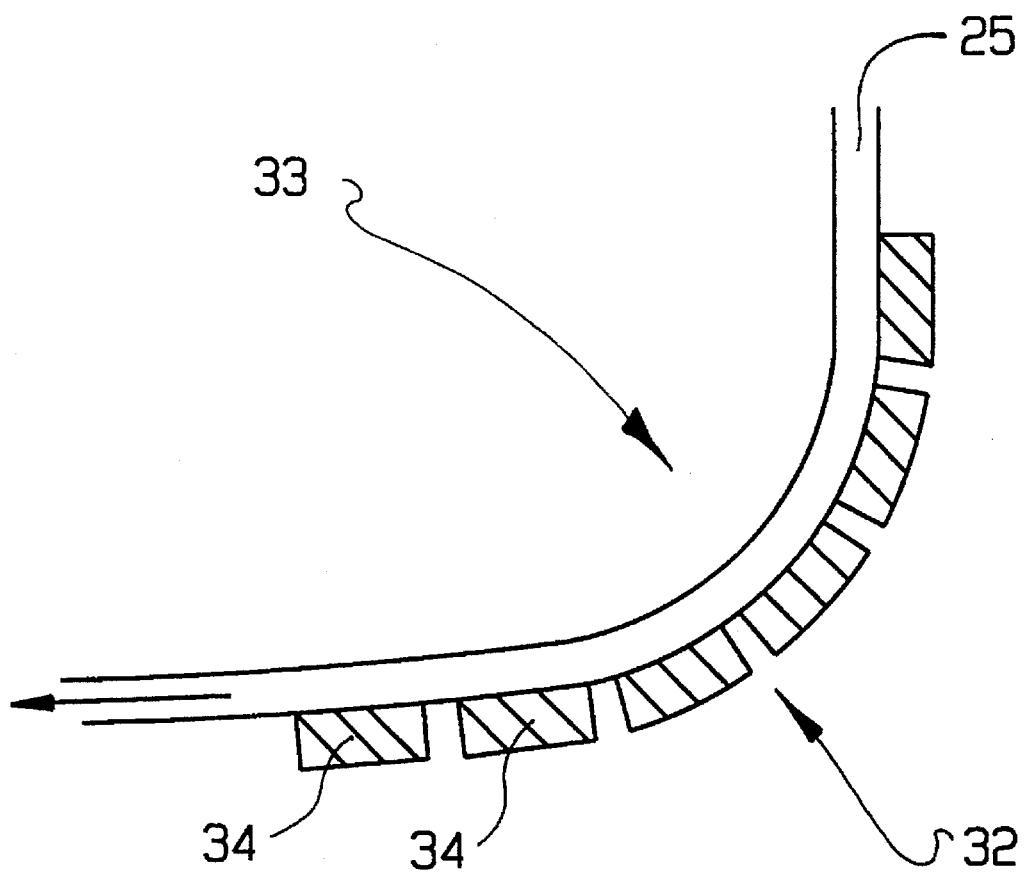
FIG. 7 is a side view of the second crown accelerator mechanism of the present invention.

A second crown accelerator 33, shown in FIG. 7, is used to further accelerate the crowns along the track 25. In particular, the crowns are accelerated as the track bends around a ninety degree angle to feed the crowns from the vertical track 25 into subsequent processing equipment, such as a horizontal star wheel where plastic material is dispensed into the crown and a liner formed therein. The curved portion of the track 32, is provided with a second plurality of electromagnets 34, which are also energized in a pulsating, sequential manner to accelerate the crowns and provide them with enough energy to feed them into the recesses of the star wheel at the appropriate speed.

The force of gravity alone is insufficient to provide the necessary feed speed, and the prior art utilized a pneumatic assist in an attempt to provide the necessary acceleration. That design was disadvantageous, however, in that it was difficult to properly time the air bursts with the movement of the crowns, especially when the feed rate is changed due to differing requirements of the production line. The present electromagnets 34 can easily be controlled by a computer to impart the necessary electromagnetic force to accelerate the crowns. Furthermore, the user can enter any speed at which the star wheel is operating, and the controlling computer will successively energize and deenergize the electromagnets to feed the crowns to the star wheel at the appropriate rate. Thus, the present design is easily adaptable to changes in crown feed rates.

Although the use of the electromagnets to propel the crowns avoids the need for air assist, it is possible to include air assist in combination with the electromagnets when even greater control over crown movement is desired. Due to the electromagnetic forces applied to the crowns described above, this system is more reliable than using air assist alone.

It is preferable to use the sorter and accelerator of the present invention in a system that includes dispensing and shaping of the liner material into the crowns after the crowns are discharged by the accelerator. The preferred method of dispensing the liner material is described in patent application Ser. No. 08/008,966 filed Jan. 26, 1993. Thus, there is provided an apparatus that uses a rotating cutting means to sever extruded liner material, and to accurately place it into crowns, even those with high sidewalls. The dispensing apparatus also preferably includes the timing device described in patent application Ser. No. 08/021,032, filed Feb. 22, 1993. That timing device provides an improved method of coordinating the cutter with the movement of the conveyor. The preferred method of shaping the liner material and molding it onto the crown is described in application Ser. No. 08/020,962, filed Feb. 22, 1993. That crown liner punch prevents liner material from flowing out of the crown shell, and also allows the temperature of the liner material to be varied by the provision of passages for heating or cooling fluid within the liner punch mechanism.

After the parts have been processed, a defective crown detection device is commonly used, such as the device disclosed in U.S. Pat. No. 4,879,025. This device detects defective crowns that did not cause blockages, but are otherwise defective. This patent is expressly incorporated herein by reference thereto.

What is claimed is:

1. An apparatus for feeding a stream of parts comprising:

a hopper bowl having an exit chute and capable of rotation for providing the stream of parts;

a sorting mechanism for orienting the stream of parts;

part motion sensing means located to detect whether the stream of parts has stopped moving through the sorting mechanism;

controlling means which receives input information from said sensing means and which provides information for rotating the hopper bowl, wherein the controlling means stops and then reverses the rotation of the hopper bowl when the sensing means detects that the stream of parts has stopped; and means for removing jammed parts from the stream if a reversal of the stream of parts fails to alleviate the problem.

2. An apparatus for feeding a stream of parts comprising:

a hopper bowl having an exit chute and capable of rotation for providing the stream of parts;

a sorting mechanism for orienting the stream of parts;

sensing means to detect whether the stream of parts has stopped moving through the sorting mechanism;

controlling means which receives input information from said sensing means and which provides information for rotating the hopper bowl, wherein the controlling means stops and then reverses the rotation of the hopper bowl when the sensing means detects that the stream of Darts has stopped; and a first air cylinder operatively associated with the controlling means to produce a clamping pressure on the exit chute of the hopper bowl to prevent additional parts from entering the sorting mechanism, wherein the controlling means activates the first air cylinder after reversing the rotation of the hopper bowl.

3. An apparatus for feeding a stream of parts comprising:

a hopper bowl having an exit chute and capable of rotation for providing the stream of parts;

a sorting mechanism for detecting and orienting the stream of parts including a plurality of finger-like elements for detecting the orientation of the parts;

part motion sensing means located to detect whether the stream of parts has stopped moving through the sorting mechanism; and controlling means which receives input information from said sensing means and which provides information for rotating the hopper bowl, wherein the controlling means stops and then reverses the rotation of the hopper bowl when the sensing means detects that the stream of parts has stopped.

4. The apparatus of claim 2 wherein the sorting mechanism comprises a twist chute having first and second tracks whereby the parts on a particular track are oriented in the same direction.

5. The apparatus of claim 4 wherein the parts on the first track are oriented differently from the parts on the second track and the sorting mechanism includes means to change the orientation of the parts on the second track so that all parts exiting the sorting mechanism have the same orientation.

6. The apparatus of claim 5 wherein the parts of each track are oriented in opposite directions and the orientation changing means reverses the orientation of the parts on the second track.

7. The apparatus of claim 5 further comprising a reservoir for receiving the oriented parts prior to further processing in the apparatus.

8. The apparatus of claim 2 further comprising a second air cylinder operatively associated with the controlling means for moving a portion of the sorting means to allow jammed parts to exit, wherein the controlling means activates the second air cylinder after the first air cylinder applies clamping pressure to the exit chute.

9. A method for feeding a stream of parts which comprises:

providing a stream of parts in one direction by rotating a hopper bowl which contains a supply of said parts;

sorting the stream of parts;

sensing motion of parts in the part stream to detect whether the stream of parts has stopped moving and are not being sorted;

reversing the direction of at least a portion of the stream of parts back to the hopper bowl in an attempt to correct the problem which caused the stream of parts to stop moving; and removing jammed parts from the stream if a reversal of the stream of parts fails to alleviate the problem.

10. The method of claim 9 which further comprises sorting the parts by detecting the orientation of the parts and aligning the parts which are oriented in the same direction.

11. The method of claim 10 wherein the parts are aligned in two different orientations, and which further comprises changing one of the orientations to correspond to the other.

12. A method for feeding a stream of parts which comprises:

providing a stream of parts in one direction by rotating a hopper bowl which contains a supply of said parts;

sorting the stream of parts;

sensing whether the stream of parts has stopped moving and are not being sorted;

reversing the direction of at least a portion of the stream of parts back to the hopper bowl in an attempt to correct the problem which caused the stream of parts to stop moving; and applying a force to stop the movement of certain parts prior to reversing the direction of the stream of parts.

13. The method of claim 12 which further comprises removing parts which become jammed during the sorting step while the force is applied to stop movement of the certain parts.

14. The apparatus of claim 2 wherein the sorting mechanism includes a plurality of finger-like elements for detecting the orientation of the parts.

15. The method of claim 12 which further comprises sorting the parts by detecting the orientation of the parts and aligning the parts which are oriented in the same direction.

16. The method of claim 15 wherein the parts are aligned in two different orientations, and which further comprises changing one of the orientations to correspond to the other.

17. The method of claim 9 wherein the direction of the portion of the stream of parts is achieved by reversing the rotation of the hopper bowl.

18. The method of claim 12 wherein the direction of the portion of the stream of parts is achieved by reversing the rotation of the hopper bowl.

* * * * *